(No Model.)

J. E. ADAMS & P. SHERO.
SADDLE.

No. 307,615. Patented Nov. 4, 1884.

WITNESSES
F. L. Durand
F. A. Fouts

INVENTOR
Jas E. Adams
Philip Shero
Per Z. P. Dederick
Attorney

UNITED STATES PATENT OFFICE.

JAMES E. ADAMS AND PHILIP SHERO, OF SHERMAN, TEXAS.

SADDLE.

SPECIFICATION forming part of Letters Patent No. 307,615, dated November 4, 1884.

Application filed February 6, 1884. (No model.)

*To all whom it may concern:*

Be it known that we, JAS. E. ADAMS and PHILIP SHERO, citizens of the United States, residing at Sherman, in the county of Grayson and State of Texas, have invented a new and useful Saddle-Seat, of which the following is a specification.

This invention relates to riding saddles; and it consists in a rubber or other elastic seat having a thick central portion with tapering thin edges and a leather covering for the same, all of which will be hereinafter specified, and pointed out in the claim.

Figure 1:
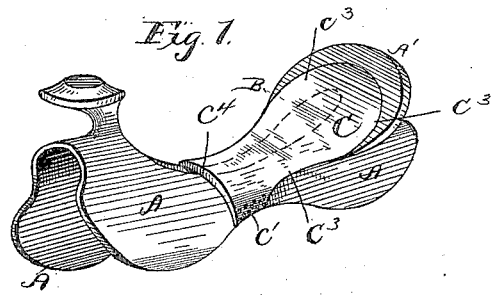
Figure 2:
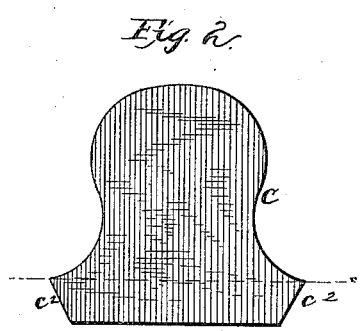
Figure 3:
Figure 4:
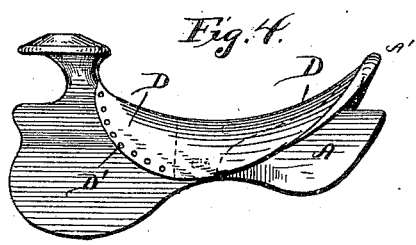

In the accompanying drawings, Figure 1 represents a perspective view of a saddle-tree provided with the rubber seat. Fig. 2 is a plan view of the rubber seat spread out. Fig. 3 is a front end view of the rubber seat, and Fig. 4 is a side elevation of the saddle and rubber seat provided with the leather cover, the rubber seat in this view being shown in dotted lines.

The letter A designates the saddle-tree, and A' the cantle thereof. B is an opening in the tree, a portion of which is covered by the rubber seat C. The edges of the rubber seat at C' C³ are thin, said seat tapering from a thick central portion, C⁴, to said edges. The seat is secured to the tree by its two wings, C², which are slightly thicker than the rear edges, C³. The wings C² are secured by tacks C' or other suitable means. D represents a thin leather covering passing around and secured to the thin edges C³ of the rubber seat. The forward edges of the leather covering are secured by tacks D' to the upper forward part of the tree, as shown in Fig. 4. The rear part of the leather covering, being fixed to the edges C³ of the seat, permits said seat and covering to move freely up and down on the cantle to conform to the play incident to the weight and movement of the rider. The rear portion of the leather covering is preferably stitched to the loose edges C³ of the rubber seat.

The advantages of the seat herein shown and described are that it provides a smooth seat that will not give down by wear and the weight of the rider, and at the same time permits a free, easy, and elastic movement of the rear portion thereof.

The advantage of the leather cover is that it protects the rubber from rain and dampness, and at the same time ornaments the saddle. It also covers the forward portion of the tree-opening B.

Having thus described our invention and set forth its advantages, we claim as new and desire to secure by Letters Patent—

A saddle constructed of the ordinary tree, and provided with a seat of rubber or other elastic material tapering from its central portion to the edges, and provided with lateral extensions at the forward part, secured to the tree at the extensions and unattached at the other portions, said seat being covered with leather, substantially as set forth.

J. E. ADAMS.
PHILIP SHERO.

Witnesses:
THOS. W. RANDOLPH,
T. BENNETT.